(12) United States Patent
Koch et al.

(10) Patent No.: US 11,870,786 B2
(45) Date of Patent: *Jan. 9, 2024

(54) ACCESS CONTROL FOR OBJECT INSTANCES

(71) Applicant: SAP SE, Walldorf (DE)

(72) Inventors: Marco Koch, Hamburg (DE); Stefan Boller, Heidelberg (DE); Manfred Schmid, Offersheim (DE)

(73) Assignee: SAP SE, Walldorf (DE)

( * ) Notice: Subject to any disclaimer, the term of this patent is extended or adjusted under 35 U.S.C. 154(b) by 34 days.

This patent is subject to a terminal disclaimer.

(21) Appl. No.: 17/819,676

(22) Filed: Aug. 15, 2022

(65) Prior Publication Data

US 2022/0394041 A1 Dec. 8, 2022

Related U.S. Application Data

(63) Continuation of application No. 17/152,895, filed on Jan. 20, 2021, now Pat. No. 11,463,448.

(60) Provisional application No. 62/989,123, filed on Mar. 13, 2020.

(51) Int. Cl.
*H04L 29/06* (2006.01)
*H04L 9/40* (2022.01)
*H04L 67/025* (2022.01)

(52) U.S. Cl.
CPC ......... *H04L 63/105* (2013.01); *H04L 63/102* (2013.01); *H04L 63/20* (2013.01); *H04L 67/025* (2013.01)

(58) Field of Classification Search
CPC ..... H04L 63/105; H04L 63/102; H04L 63/20; H04L 67/025
See application file for complete search history.

(56) References Cited

U.S. PATENT DOCUMENTS

| 7,788,711 B1 | 8/2010 | Sun et al. |
| 9,842,218 B1 | 12/2017 | Brisebois et al. |
| 11,463,448 B2 * | 10/2022 | Koch ..................... H04L 67/025 |
| 2012/0167197 A1 * | 6/2012 | Kruger ..................... G06F 16/00 726/16 |
| 2014/0250534 A1 * | 9/2014 | Flores ................. G06F 21/6209 726/26 |

(Continued)

*Primary Examiner* — Baotran N To
(74) *Attorney, Agent, or Firm* — Fish & Richardson P.C.

(57) ABSTRACT

The present disclosure involves systems, software, and computer implemented methods for access control for object instances. A method includes receiving, at a cloud application, a user request associated with a user. The user request corresponds to an instance of a first application artifact type. Role assignments for the user are retrieved from a cloud platform and a determination is made that the role assignments grant permission to the first application artifact type to the user. A determination is made that a first instance-based access policy exists for the first application artifact type. A determination is made regarding whether the first instance-based access policy grants permission for the user to access the instance. The user request is serviced in response to determining that the first instance-based access policy grants permission for the user to access the instance. The use request is denied in response to determining that the first instance-based access policy does not grant permission for the user to access the instance.

20 Claims, 7 Drawing Sheets

(56) References Cited

U.S. PATENT DOCUMENTS

| | | |
|---|---|---|
| 2017/0039492 A1 | 2/2017 | Henke et al. |
| 2017/0235716 A1 | 8/2017 | Arrowood et al. |
| 2021/0288972 A1 | 9/2021 | Koch et al. |
| 2021/0306338 A1 | 9/2021 | Miriyala et al. |

* cited by examiner

ACCESS CONTROL FOR OBJECT INSTANCES

CLAIM OF PRIORITY

This application claims priority under 35 USC § 120 to U.S. patent application Ser. No. 17/152,895, filed on Jan. 20, 2021, titled "ACCESS CONTROL FOR OBJECT INSTANCES"; which claims priority under § 119(e) to U.S. Patent Provisional Application Ser. No. 62/989,123, filed on Mar. 13, 2020, titled "ACCESS CONTROL FOR OBJECT INSTANCES"; the entire contents of each and both are hereby incorporated by reference.

BACKGROUND

An integration scenario can model integration and connectivity between two computing systems. Different computing systems can communicate, for example, in business to business (B2B) communication, electronic data interchange (EDI), or some other type of system-to-system or server-to-server communication. The modeling of an integration scenario can include the creation of a process model that describes the integration scenario. In an integration scenario, a sending component in a sending system can send a message to a receiving component in a receiving system. The receiving component may perform some processing on the message and may also initiate one or more downstream tasks to perform other processing in response to receipt of the message.

SUMMARY

The present disclosure involves systems, software, and computer implemented methods for access control for object instances. An example method includes: receiving, at a cloud application, a user request associated with a first user, wherein the user request corresponds to a first instance of an application artifact having a first artifact type; retrieving, from a cloud platform, role assignments for the first user; determining that the role assignments grant permission to the artifact type to the first user; determining that a first instance-based access policy exists for the artifact type; determining whether the first instance-based access policy grants permission for the first user to access the first instance of the application artifact; in response to determining that the first instance-based access policy grants permission for the first user to access the first instance of the application artifact, servicing the user request; and in response to determining that the first instance-based access policy does not grant permission for the first user to access the first instance of the application artifact, denying the user request.

A cloud-based integration platform may typically include many (e.g., thousands of) users working in parallel on different integration flows. A platform may provide a role-based authorization system that grants access to all or no objects of a specific type. Some organizations may desire more fine-grained access, such as restricting access to certain objects to users belonging to a certain line of business (LoB). For example, an organization may want to enforce that objects that include personally-identifiable data only be accessible by members of a human resource (HR) department. Such fine-grained access to objects may not be able to be enforced with just a role-based authorization mechanism. Some organizations may restrict access by using different tenants to separate different LoBs. However, such an approach may not be acceptable to all users or organizations, since multiple tenants generally increases setup and maintenance complexity and cost, which generally results in a higher TCO (Total Cost of Ownership), as compared to a single-tenant setup.

To allow customers to continue to use one tenant but restrict access to certain object instances, a generic mechanism can be used that provides object-instance-based access control. For example, administrators can configure rules to relate users to different object instances. These rules can be represented in access policies. An access policy can allow a user base to have conditional access to different kinds of object instances based on defined conditions on instance attributes. Access policies can be stored independently from referencing object instances. Access policies can be maintained using a web-based user interface and can be evaluated during each access to an object instance.

The subject matter described in this specification can be implemented to realize one or more of the following advantages. First, access rules for object instances can be stored independently from relevant object instances. Second, a customer can use a single tenant for cloud platform integration for multiple lines of business while defining access rules for object instances for different user groups. Third, a multi-step approach can be used to evaluate if an end-user has access to an object instance. Fourth, a graphical user interface can be provided to maintain access policy rules.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

Like reference numbers and designations in the various drawings indicate like elements.

DETAILED DESCRIPTION

The following detailed description describes access control for object instances, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A cloud platform integration (CPI) system can be used to integrate different systems, such as a source system and a target system. An integration flow can be modeled and then executed to perform an integration between systems. The integration flow can include a source system representation, a target system representation, and other objects or artifacts that may be used during an integration. Integration artifacts can include, for example, transformation rules, message metadata, message instances (including message traces), message queues, message APIs (Application Programming Interfaces), key storage and other data storage representations, including temporary or intermediate storage, global variables (for communicating between integration flows), message attachments, or other types of artifacts. A given integration flow or set of integration flows may include or use a variety and number of artifacts or components, beyond just messages passed between systems. Other artifact types can include message processing logs, known host lists, credentials, public and secret keyrings, secure parameters, number ranges, and message locks, and value mappings, for example.

Organizational or customer requirements may specify that access to certain data or types of data be restricted. A role-based system can be used that enables certain users to access certain types of objects or artifacts. For instance, a first role, which may be assigned, for example, to first and second users, may enable the first and second users to generally access message attachments. A role-based system may not offer a refined enough granularity for all security use cases. For instance, a system requirement may be that the first user should be able to access some but not all message attachment instances. For example, a HR system may use an integration flow to consolidate HR data from a German sub-system and an Indian sub-system (and possibly other systems) into a central HR system. System requirements (and possibly legal requirements) may specify that only certain users (e.g., an administrator or HR personnel) have access to attachments used by the HR integration flow. For example, general integration support personnel, while generally allowed to view message attachments, may be prohibited, using an object-based access control approach, from accessing specific message attachments used in the HR integration flow.

More-refined approaches can be used as well, to further limit access to certain instances. For instance, a HR user in a German office may be able to access (e.g., for troubleshooting purposes) a HR attachment generated by the German sub-system, but may not be allowed to access a HR attachment generated by the Indian sub-system. Instance-based access can be controlled by rules which match (and allow access to) instances based on identifier, name, or more general regular-expression based matches.

While cloud platform integration is described, a same instance-based approach can be used for other types of applications that are built on top of a cloud platform. Instances may be object instances, class instances, artifact instances, or some other type of instance of some other abstract category or type. Accordingly, "artifact instance" and "object instance" may be used generally synonymously in this disclosure.

Figure 1:
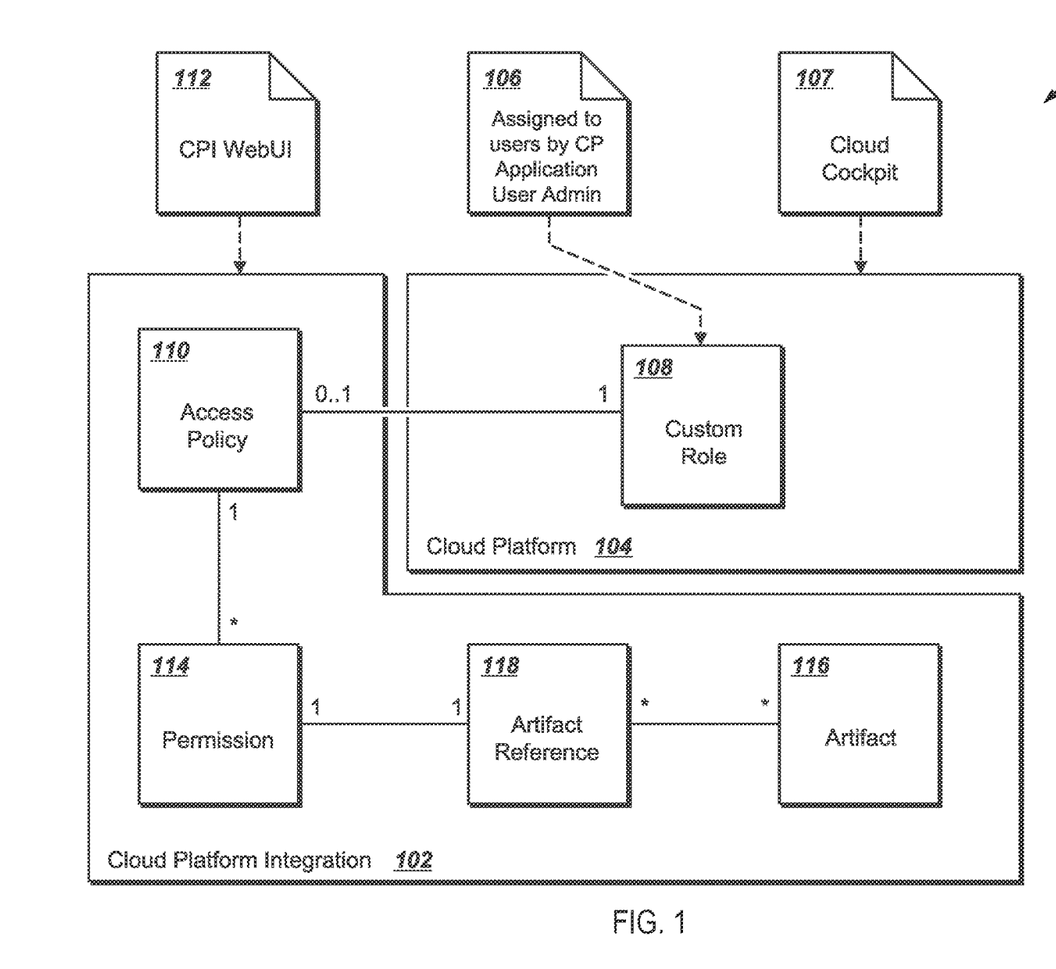
FIG. 1 illustrates an example of a system for instance-based access control configuration.

FIG. 1 illustrates an example of a system 100 for instance-based access control configuration. Instance-based access control can be configured for a CPI system 102 that is built on top of a cloud platform 104. Other types of cloud-based applications can use similar instance-based access control. In some implementations, instance-based access control can be integrated with role-based access control.

For instance and as indicated by a note 106, a cloud platform (CP) application user administrator can create and assign roles to users or user groups (e.g., using a cloud cockpit 107 or other user interface). In some implementations, a custom role 108 can be defined in the cloud platform 104, for integration with instance-based rules. The custom role 108 (or other role defined in the cloud platform 104) can, for example, be associated with an object or artifact type privilege. For example, a role may be defined that enables users to access an artifact of a given type. For instance, a role can define a privilege of accessing message trace artifacts, message attachments, or some other type of artifact.

A role defined in the cloud platform 104 can be linked to an access policy 110 defined in the CPI system 102. An application administrator can use a CPI user interface 112 to configure an access policy, and link the access policy to an existing role, for example. As described in more detail below, linking a cloud platform role to an application access policy can enable access control for all artifact types and can enable always-visible artifact instances.

The application administrator can correlate the access policy 110 to the custom role 108, to configure the role to apply to certain artifact instances of a given type. Accordingly, the access policy 110 can be used for instance-based authorizations. The access policy 110 can store a list of permissions 114 that can be used to guard access to artifact instances and associated data. For example, the access policy 110 can have multiple entries, and each entry can represent permissions 114 associated with an artifact instance 116 or resulting data of an integration flow. Resulting data can include all data generated by an integration platform when executing message processing or other aspects of an integration flow. Resulting data can include message processing logs, message traces, attachments, data store entries, variables, and message queue entries. Instance-based protection can extend (or be applied) to any relevant artifact type or type of resulting data. The artifact instance 116 or resulting data can be identified using an artifact reference 118. The artifact reference 118 can indicate an attribute name (and value) of an attribute that can uniquely identify the artifact instance 116. For example, the artifact instance 116 can be referenced by an artifact identifier and/or an artifact name.

In some implementations, since roles are defined in one system (e.g., the cloud platform 104) and access policies are defined in another system (e.g., the CPI system 102) a consistency check is (e.g., occasionally) performed to validate whether all roles referenced by existing access policies still exist. A CP administrator may have deleted a role referenced by an access policy, for example. An access policy without a role can be considered obsolete. A consistency check can include providing an administrator an option to delete or reconfigure an obsolete access policy. In some implementations, the cloud platform 104 is configured to query the CPI system 102, upon a request to delete a role, to determine whether the role is referenced in any access policies. A role that is referenced in access policy may be blocked from being deleted until references are removed.

Figure 2:
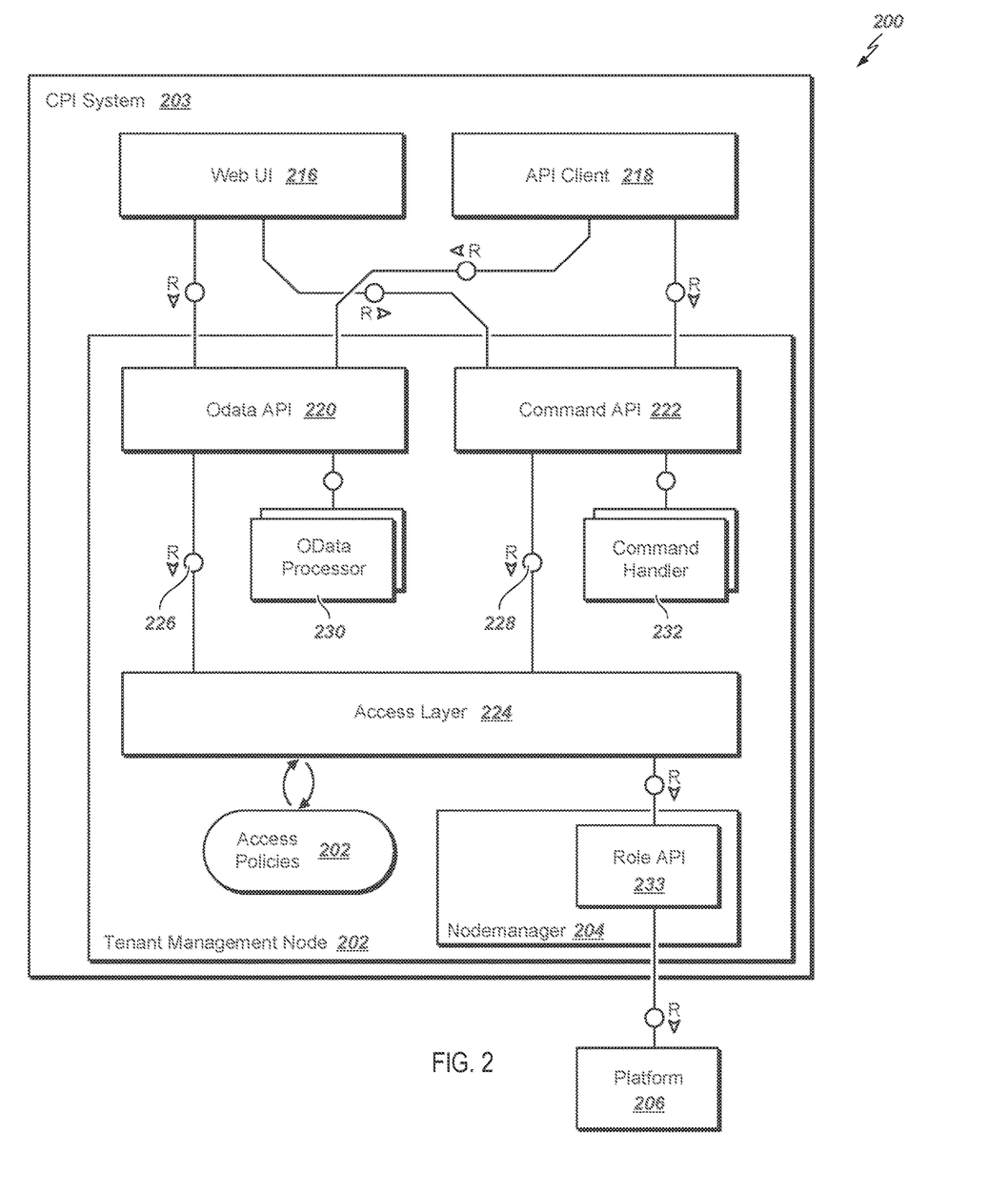
FIG. 2 illustrates an example of a system for applying instance-based access policies.

FIG. 2 illustrates an example of a system 200 for applying instance-based access policies. As mentioned, some customers may prefer to use one tenant for integration scenarios. Accordingly, a tenant management node 202, of a CPI system 203, can manage integrations included in the customer's tenant. A node manager component 204 can interface with a cloud platform 206 that services the CPI system 203, for example.

Incorporating instance-based access control into a single tenant can provide various advantages. For instance, some large companies may have multiple departments or sub-organizations, but may desire or prefer to store integration data in one tenant, to reduce total cost of ownership as compared to supporting or using multiple tenants or systems. Instance-based access policies can be beneficial for such customers, since integration content can be stored in the single tenant but can be access-controlled according to instances, based on instance-based rules. The customer can still use the single tenant for different types of integration content, such as internally-developed content, partner-developed content, and integration content shipped with an integration platform. Internally-developed content may be content that is developed by different departments. Instance-based rules can be configured that restrict, for example, HR content from view by non HR users, internally-developed content from view by partner users, first department content from view by other-department users, etc.

The CPI system 203 can provide various entry points for user interfaces (or other applications). For example, user interface requests 208 or 210, or application requests 212 or 214, can be received from a user interface 216 or an API 218, respectively. Application or user interface based requests can be received by the tenant management node 202 at an Odata API interface 220, a command API interface 222, or at some other type of interface. The Odata API interface 220 can be configured to handle Odata requests. The command API interface 222 can be configured to handle command-based requests (e.g., internal or external commands issued using a command-based API). The user interface 216 can be used by a user to execute and monitor integration flows, for example.

A request from the user interface 216 (or from another application) can include or be associated with a request to access an artifact instance. The request to access the artifact instance can be forwarded to and handled by an access layer 224 (e.g., as a forwarded request 226 or 228). If the access layer 224 approves the request, a corresponding Odata or command request can be handled, for example, by an Odata processor 230 or a command handler 232, respectively. If user privileges are not sufficient to access the instance, an error message can be displayed, or some other type of action can be performed (or the request can simply be denied). In some implementations, an access request is sent by the user interface 216 before an instance is shown to a user (e.g., before instance information is presented), and if the access request is denied, the instance information is simply not presented. If the access request is accepted, instance information can then be displayed.

The access layer 224 can perform a multi-step approach to determine whether the requesting user has permission to access the artifact instance, by checking whether the user's request conforms to configured access policies. The multi-step approach can include using instance-based rules in combination with role-based access. For instance, a first step can include determining whether a user has access to artifacts of a certain type. For instance, the access layer 224 can determine whether a user has access, based on a user role, to message trace objects. The access layer 224 can use a role API 233 to retrieve role information for the current user, for example. If the user's role does not enable access to message trace objects, the user can be prevented from accessing message trace objects.

If the user's role enables access to message trace objects, the system can next determine, in a second step, whether any instance-based rules have been defined for message trace objects. If at least one instance-based rule has been defined for message trace objects, the rule(s) can be evaluated, in a third step, to determine whether any rules are relevant to the artifact instance in question. If rule(s) relate to the artifact instance in question, the access layer 224 can determine whether the rule grants access to the artifact instance to the user.

In summary, the first step, relating to roles, can be a functional access control step that ensures that a user has a certain general privilege (such as viewing message traces). The second and third steps can be instance-related checks, for confirming whether the user is allowed to perform a requested action on a particular object instance.

In some implementations, access is general (e.g., the user may be deemed as able to access, or not access, a given instance). In other implementations, access can be action-specific, in that a user may be enabled to perform only certain actions, from among a set of actions, on certain object instances.

An access policy data store 234 can store access policies and related information (e.g., permissions, artifact references). Access policy information can be stored independently from the referenced artifacts. Other types of systems may store access information with the artifact, for example.

Figure 3:
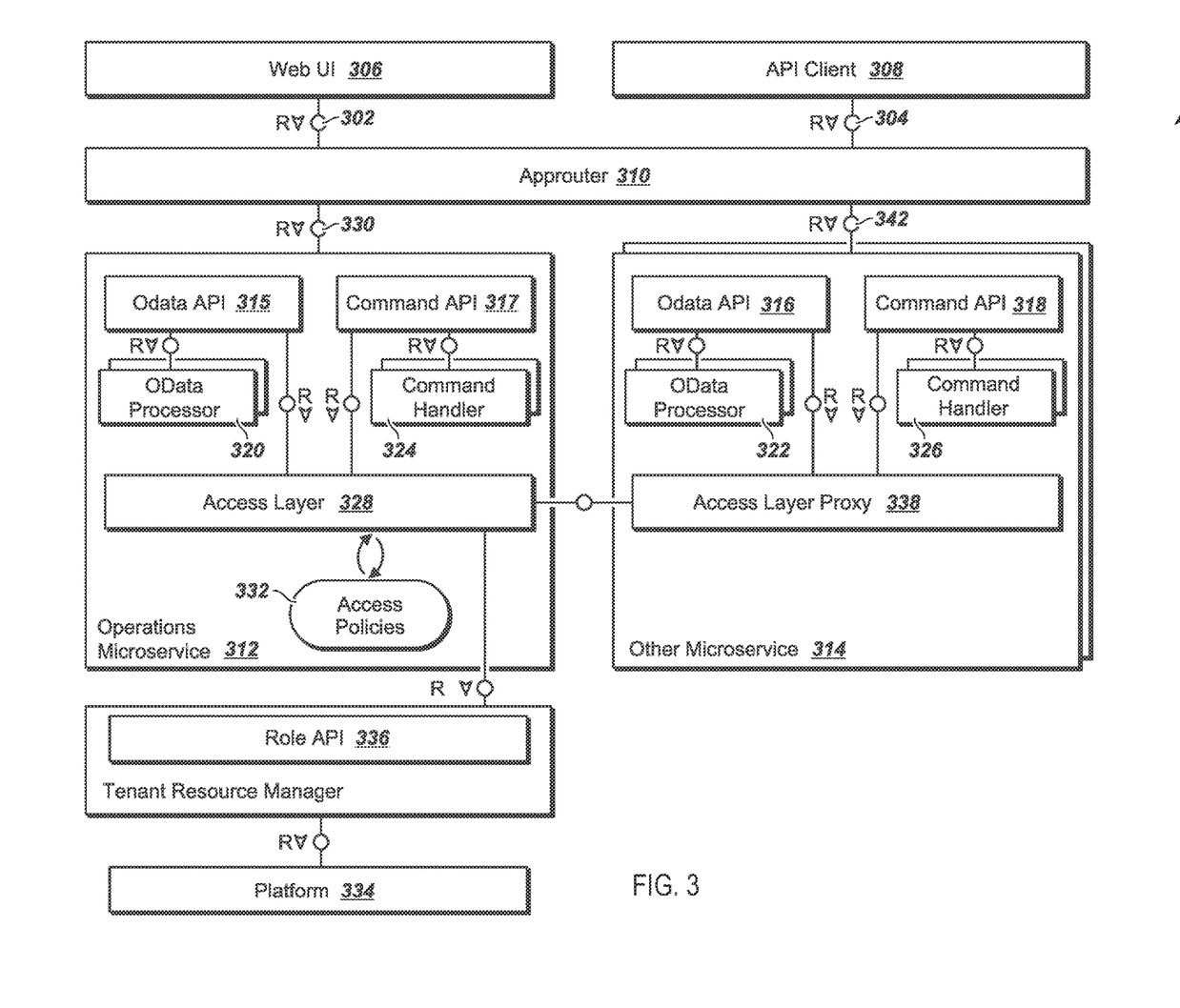
FIG. 3 is an example of a system for applying instance-based access policies in a microservice environment.

FIG. 3 is an example of a system 300 for applying instance-based access policies in a microservice environment. Application requests 302 and 304, which can each correlate to a request for an artifact, can come from a user interface 306, or an API 308, respectively. In some implementations, an application router 310 forwards a request to one or more microservices, such as an operations microservice 311 or a second microservice 312. Different microservices can provide different integration services, for example. Similar to the tenant management node 202 described above with respect to FIG. 2, the operations microservice 312 and the second microservice 314 include an Odata API interface 315 or 316, a command API interface 317 or 318, an Odata processor 320 or 322, and a command handler 324 or 326, respectively.

The operations microservice 312 includes an access layer 328, which can serve a similar (or same) purpose as the access layer 224 described above with respect to FIG. 2. For instance, the access layer 328 can, in response to a request 330, determine whether a current user associated with the request 330 is allowed to access an artifact instance, based on access policies stored in an access policy data store 332 and on role(s) of the user that have been defined for a cloud platform 334 and that have been retrieved by the access layer 328 using a role API 336.

Other microservices, other than the operations microservice 312, such as the second microservice 314, can use the access layer 328 using a respective proxy (e.g., an access layer proxy 338). The access layer proxy 338 can send a request 340 to the access layer 328 (or otherwise use other services of the access layer 328 as exposed by an API). The request 340 can correspond to a user (or API) request 342 received at the second microservice 314. The request 342 can correspond to a request to access an artifact instance. The access layer proxy 338 can request that the access layer 328 determine whether a current user can access the artifact instance. The access layer 328 can provide a response that indicates whether the user should be allowed to access the artifact instance. The access layer proxy 338 can receive the response and act accordingly (e.g., by either granting or denying access to the artifact instance).

Figure 4:
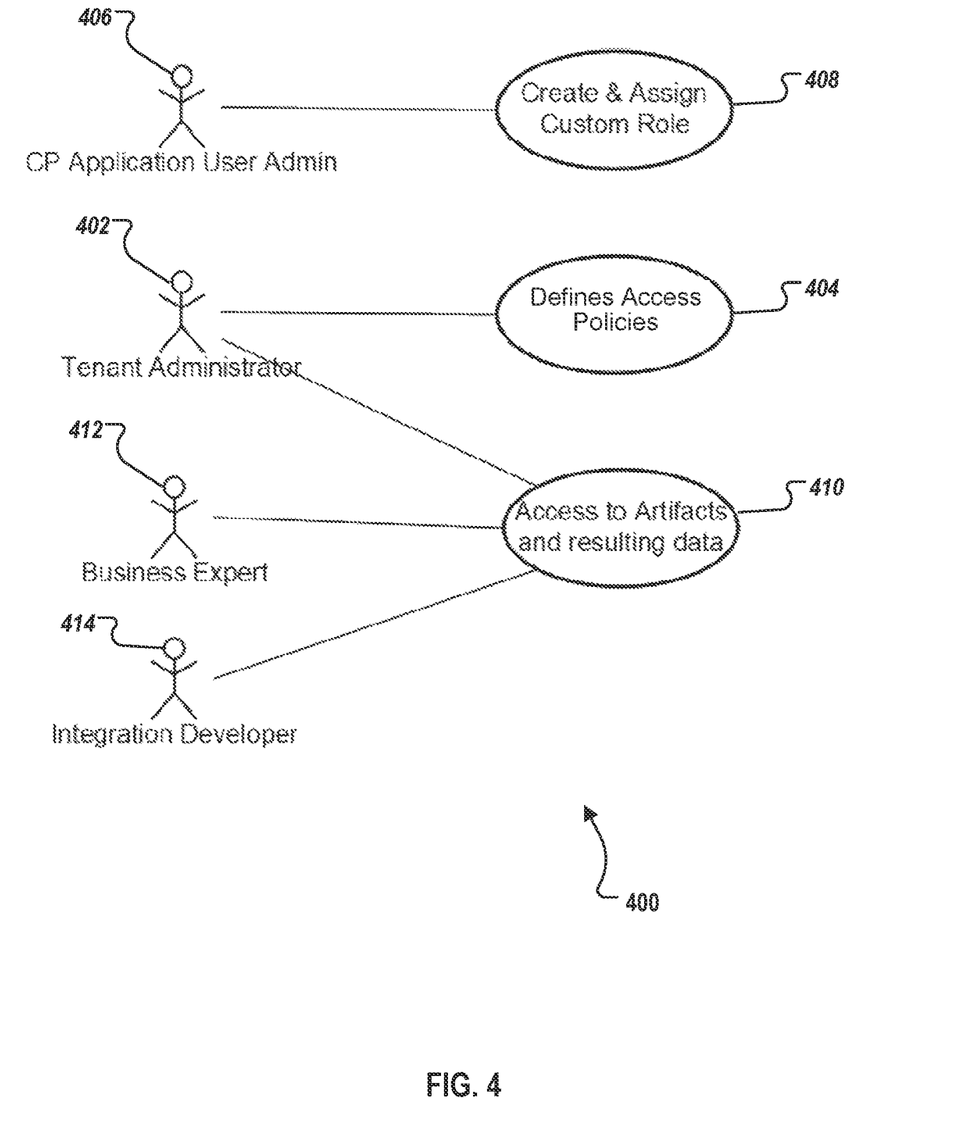
FIG. 4 illustrates various examples of user personas.

FIG. 4 illustrates various examples of user personas 400. Various user personas 400 can interface with the access policy feature. For example, a tenant administrator 402 can maintain access policy definitions (e.g., or define access policy entries (404)). The tenant administrator 402 can define access control lists to restrict access to artifacts and resulting data, per user. The tenant administrator 402 can link an access policy to a role that has been defined by a CP application user administrator 406. The CP application user administrator 406 can use a cloud platform to assign custom roles (408) to CPI users, for example.

Once access policies have been defined and linked to roles, access to artifacts and resulting data can be controlled by the access policies (410). For example, an access policy can control what artifacts a business expert 412 can access. A business expert 412 can monitor integration flows and the status of integration artifacts, including viewing message payload and attachments. With the use of access policies, a business expert 412 can be allowed to see those artifacts and resulting data for which corresponding permissions have been assigned. As another example, access policies can be used to control access to artifacts by integration developers 414. An integration developer 414 can create, edit, deploy, and monitor integration flows, for example. Access policies can be used to refine exactly which artifacts the integration developer 414 can access.

Figure 5:
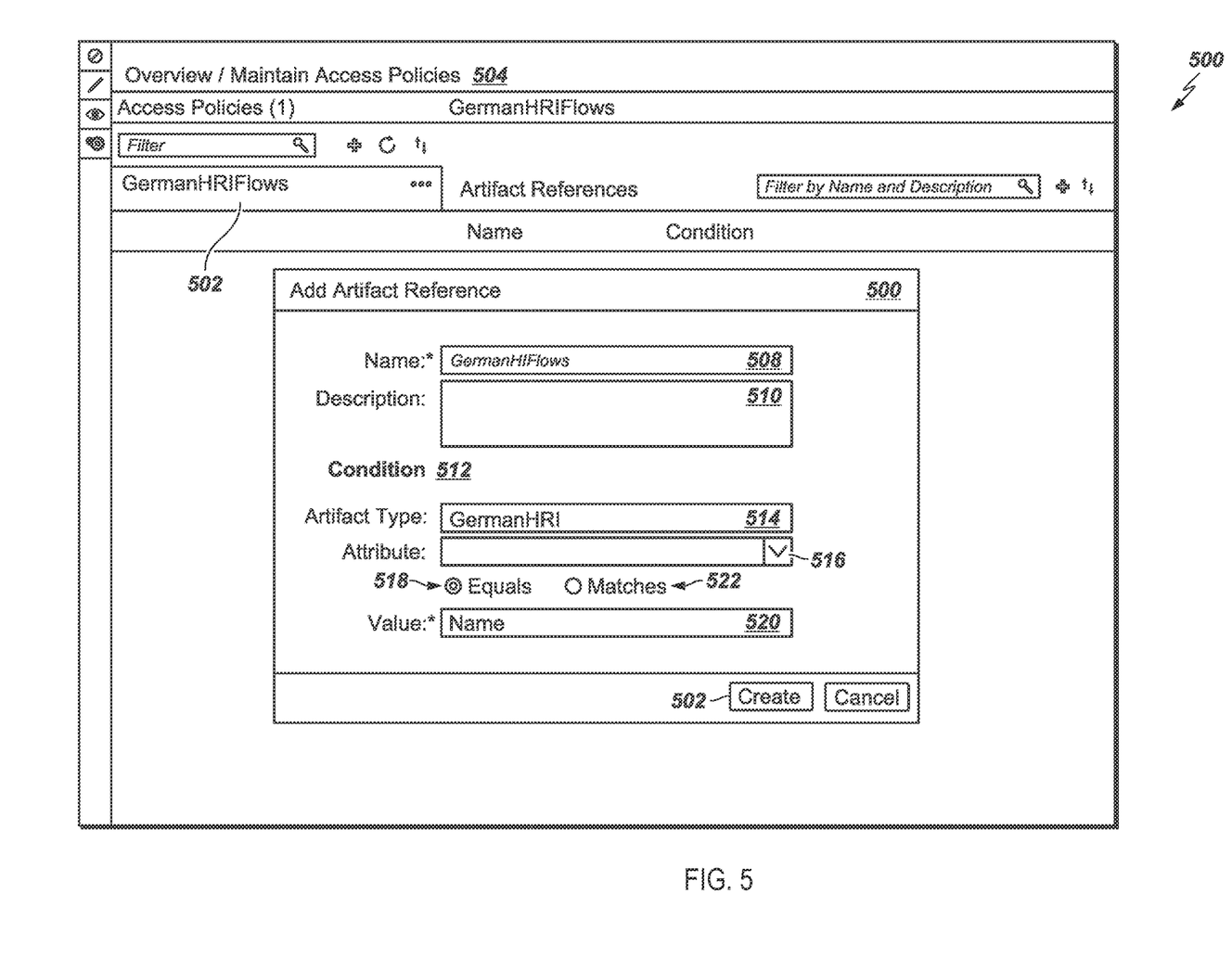
FIG. 5 is an example of a user interface for adding artifact references to an access policy.

FIG. 5 is an example of a user interface 500 for adding artifact references to an access policy. The user interface 500 can be displayed in reference to a previously-selected access policy (e.g., a user may have selected an access policy 502 on an underlying user interface 504, and then selected another user interface item to add an artifact reference to the selected policy).

The access policy 502 may be associated with a role, such as a role assigned to HR users of a German line of business for an organization. The user interface 500 can be displayed to configure a rule that, when applied, allows only users with the role to access integration flow instances that have been developed for HR data for the German line of business. A name 506 and description 508 of the artifact reference can be entered in the user interface 500. A condition area 512 can enable a user to define a condition that results in identification of desired integration flow instances. For example, an artifact type 514 of Integration Flow has been selected. A name attribute 516 has been selected, along with an equals operator 518 and a value 520 of "GermanHR" (e.g., a name of a particular integration flow). Regular expressions can also be used to match one or more instances, e.g., if a "matches" operator 522 is selected.

Selection of another type of artifact may result in other options. For instance, although an integration flow may be identifiable using a name (or perhaps an identifier), other artifact types may have other types of attributes for identification, which may enable selection (and configuration) of other types of matching rules or conditions. Accordingly, the user interface 500 can be dynamic, based on a selected artifact type.

A create item 524 can be selected to associate the artifact reference with the access policy 502. Creation (and modification) of access policies, artifact references, and correlation of access policies to roles can be logged.

In some implementation, definition and application of access control can be hierarchical. For instance, an integration flow or an integration package can be treated as an artifact type, and access can be provided to particular integration flow instances or integration packages. Access permissions to other artifacts included in a respective integration flow or integration package can be inherited (or prohibited) based on defined rules for the containing integration flow or package.

Different approaches can be used with respect to filtering artifact instances based on access policies. With a first approach, artifact instances are only displayed to a user when the user has access policy permissions (through an associated role). Such an approach can have disadvantages. For example, a new user may not be able to see any artifact instances until all appropriate roles have been assigned. Additionally, application designers may desire that some artifacts are always visible, but if artifacts are hidden until a role is assigned, always-visible artifacts may not be possible. Another approach can be used in which users can view/access artifact instances that are not referenced in any access policy, and artifact instances for which access policies apply to the user (and the instance), with other instances (potentially) being hidden from the user if they are included in an access policy which does not match the user. This approach allows for some artifacts to be always visible (if they are never included in an access policy) and for new users to see at least some artifacts before all roles have been assigned to the user.

Figure 6:
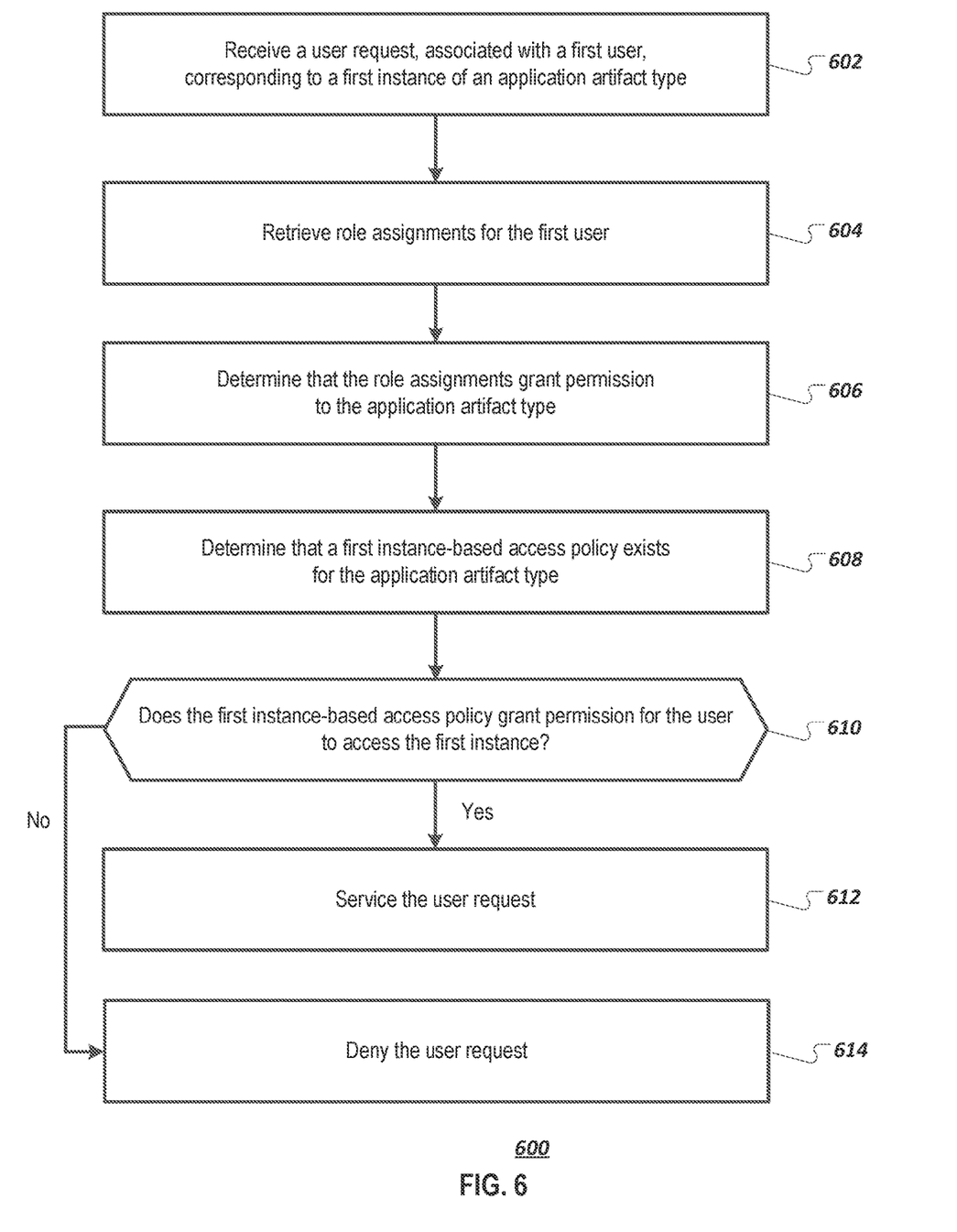
FIG. 6 is a flowchart illustrating an example of a computer-implemented method for access control for object instances.

FIG. 6 is a flowchart illustrating an example of a computer-implemented method 600 for access control for object instances. It will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a user request associated with a first user is received, at a cloud application. The user request corresponds to a first instance of a first application artifact type. The cloud application can be a cloud platform integration application or another type of application. The first application artifact type can be a type of integration flow artifact, such as an integration flow itself, a message queue, a message trace, a log, a data store, a message attachment, or some other type of artifact.

At 604, role assignments for the first user are retrieved, from a cloud platform.

At 606, a determination is made that the role assignments grant permission to the first application artifact type to the first user. Other requests, (e.g., a second request for a second instance of a second application artifact type) can be defined if role assignments do not grant permission, e.g., to the second application artifact type.

At 608, a determination is made that a first instance-based access policy exists for the first application artifact type. The first instance-based access policy can be linked to the first role assignments, for example. In some cases, a consistency check can be (e.g., periodically) performed that includes identifying the linking between the first instance-based access policy and the first role assignments and determining whether the first role assignments are still configured in the cloud platform. For other requests, such as the second request, if an instance-based policy does not exist for the second application artifact type, the request can be serviced (e.g., assuming role permissions enable access to the second artifact type in general).

At 610, a determination is made as to whether the first instance-based access policy grants permission for the first user to access the first instance.

At 612, in response to determining that the first instance-based access policy grants permission for the first user to access the first instance, the user request is serviced. Determining that the first instance-based access policy grants permission for the first user to access the first instance can include matching the first instance to the first instance-based policy based on a first artifact reference of the first instance. Matching can include an exact match or a pattern-based (e.g., regular expression based) match of the first artifact reference to the first instance-based access policy. The first artifact reference can be an artifact instance identifier or an artifact instance name. Different types of artifacts can have different types of artifact references.

At 614, in response to determining that the first instance-based access policy does not grant permission for the first user to access the first instance, the user request is denied. An attempt to match the first artifact reference to the first instance-based access policy may have failed, for example.

Figure 7:
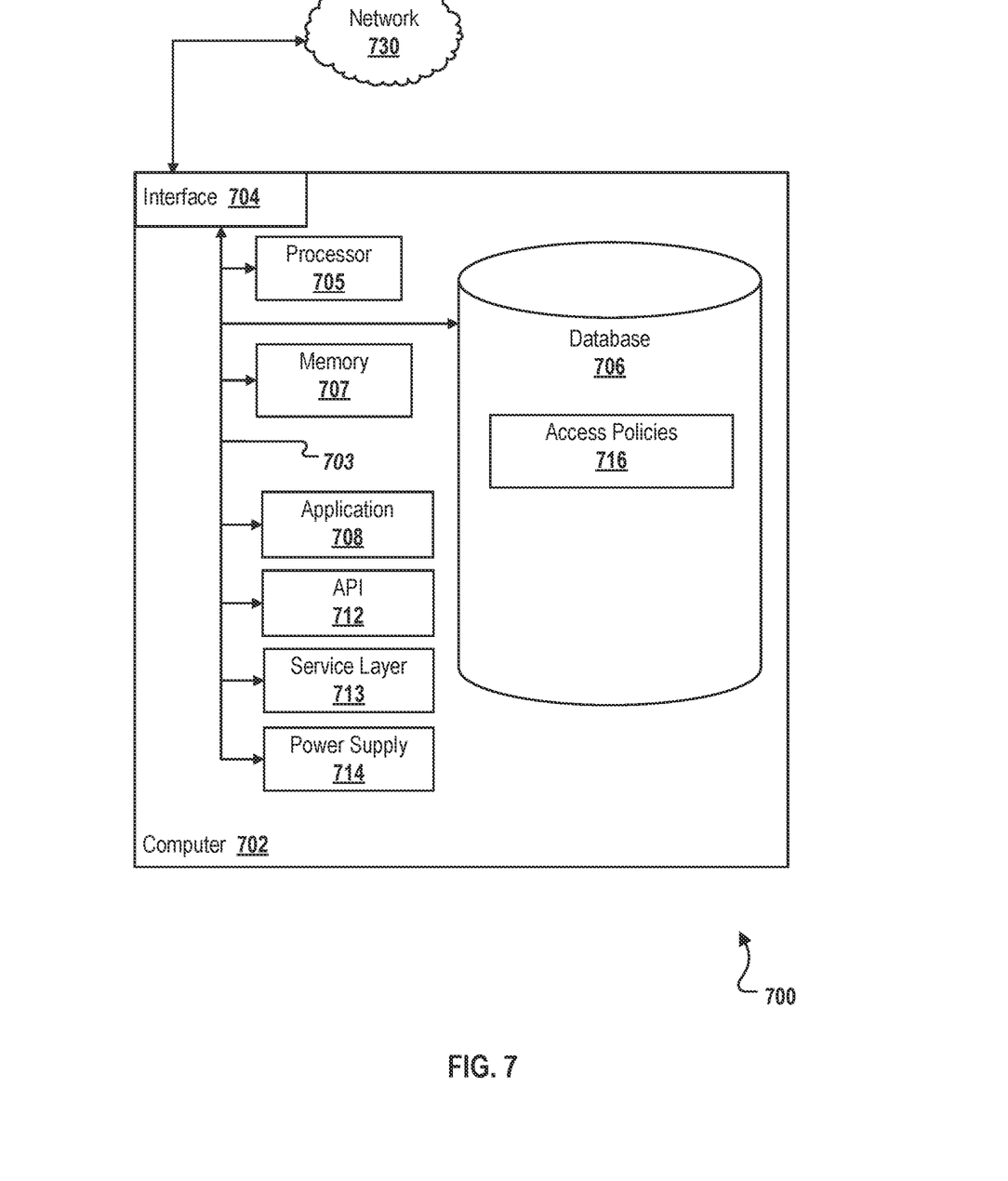
FIG. 7 is a block diagram illustrating an example of a computer-implemented system used to provide computational functionalities associated with described algorithms, methods, functions, processes, flows, and procedures.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, System 700 includes a Computer 702 and a Network 730.

The illustrated Computer 702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 702 can include an input device, such as a keypad, keyboard, or touch screen, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as, for example, a client, network component, a server, or a database or another persistency, or a combination of roles for performing the subject matter described in the present disclosure. The illustrated Computer 702 is communicably coupled with a Network 730. In some implementations, one or more components of the Computer 702 can be configured to operate within an environment, or a combination of environments, including cloud-computing, local, or global.

At a high level, the Computer 702 is an electronic computing device operable to receive, transmit, process, store, or manage data and information associated with the described subject matter. According to some implementations, the Computer 702 can also include or be communicably coupled with a server, such as an application server, e-mail server, web server, caching server, or streaming data server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include specifications for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702. Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory or conventional database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702. As illustrated, the Database 706 holds the previously described access policies 718.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer implemented method, comprising:
   receiving, at a cloud application, a first request associated with a first user, wherein the first request corresponds to a first instance of a first artifact type;
   determining that a first instance-based access policy exists for the first artifact type, the first instance-based access policy comprising a matching rule that selectively enables access to instances of the first artifact type;
   evaluating the matching rule with respect to the first instance to determine whether the first instance-based access policy grants permission for the first user to access the first instance;
   in response to determining that the first instance-based access policy grants permission for the first user to access the first instance, servicing the first request; and
   in response to determining that the first instance-based access policy does not grant permission for the first user to access the first instance, denying the first request.

2. The method of claim 1, wherein the first instance-based access policy is linked to first role assignments for the first user that grant permission to the first artifact type for the first user.

3. The method of claim 2, further comprising performing a consistency check that includes identifying the linking between the first instance-based access policy and the first role assignments and determining whether the first role assignments are still configured in the cloud platform.

4. The method of claim 2, further comprising:
   receiving, at the cloud application, a second request associated with a second user, wherein the second request corresponds to a second instance of a second artifact type; and
   retrieving, from the cloud platform, second role assignments for the second user.

5. The method of claim 4, further comprising:
   determining that the second role assignments do not grant permission to the second artifact type to the second user; and
   in response to determining that the second role assignments do not grant permission to the second artifact type to the second user, denying the second request.

6. The method of claim 4, further comprising:
   determining that the second role assignments grant permission to the second artifact type to the second user;
   determining that no instance-based policies exist for the second artifact type; and
   determining to service the second request based on the second role assignments granting permission to the second artifact type to the second user and a lack of instance-based policies for the second artifact type.

7. The method of claim 4, wherein the cloud application is a cloud platform integration application.

8. The method of claim 7, wherein the first artifact type and the second artifact type are types of integration flow artifacts.

9. The method of claim 4, wherein determining whether the first instance-based access policy grants permission for the first user to access the first instance comprises matching the first instance to the first instance-based policy based on a first artifact reference of the first instance.

10. The method of claim 9, wherein the matching comprises matching the first artifact reference to the first instance-based policy using a regular expression.

11. The method of claim 9, wherein the first artifact reference is an artifact instance identifier or an artifact instance name.

12. The method of claim 9 wherein the first artifact reference is of a first artifact reference type, the second instance has a second artifact reference of a second artifact reference type that is different from the first artifact reference type, and the second artifact reference is included in a second instance-based policy.

13. A system comprising:
one or more computers; and
a computer-readable medium coupled to the one or more computers having instructions stored thereon which, when executed by the one or more computers, cause the one or more computers to perform operations comprising:
receiving, at a cloud application, a first request associated with a first user, wherein the first user request corresponds to a first instance of a first artifact type;
determining that a first instance-based access policy exists for the first artifact type, the first instance-based access policy comprising a matching rule that selectively enables access to instances of the first artifact type;
evaluating the matching rule with respect to the first instance to determine whether the first instance-based access policy grants permission for the first user to access the first instance;
in response to determining that the first instance-based access policy grants permission for the first user to access the first instance, servicing the first request; and
in response to determining that the first instance-based access policy does not grant permission for the first user to access the first instance, denying the first request.

14. The system of claim 13, wherein the operations further comprise:
receiving, at the cloud application, a second request associated with a second user, wherein the second request corresponds to a second instance of a second artifact type; and
retrieving, from the cloud platform, role assignments for the second user.

15. The system of claim 14, wherein the operations further comprise:
determining that the role assignments do not grant permission to the second artifact type to the second user; and
in response to determining that the role assignments do not grant permission to the second artifact type to the second user, denying the second request.

16. The system of claim 14, wherein the operations further comprise:
determining that the role assignments grant permission to the second artifact type to the second user;
determining that no instance-based policies exist for the second artifact type; and
determining to service the second request based on the role assignments granting permission to the second artifact type to the second user and a lack of instance-based policies for the second artifact type.

17. A computer program product encoded on a non-transitory storage medium, the product comprising non-transitory, computer readable instructions for causing one or more processors to perform operations comprising:
receiving, at a cloud application, a first request associated with a first user, wherein the first user request corresponds to a first instance of a first artifact type;
determining that a first instance-based access policy exists for the first application artifact type, the first instance-based access policy comprising a matching rule that selectively enables access to instances of the first artifact type;
evaluating the matching rule with respect to the first instance to determine whether the first instance-based access policy grants permission for the first user to access the first instance;
in response to determining that the first instance-based access policy grants permission for the first user to access the first instance, servicing the first request; and
in response to determining that the first instance-based access policy does not grant permission for the first user to access the first instance, denying the first request.

18. The computer program product of claim 17, wherein the operations further comprise:
receiving, at the cloud application, a second request associated with a second user, wherein the second request corresponds to a second instance of a second artifact type; and
retrieving, from the cloud platform, role assignments for the second user.

19. The computer program product of claim 18, wherein the operations further comprise:
determining that the role assignments do not grant permission to the second artifact type to the second user; and
in response to determining that the role assignments do not grant permission to the second artifact type to the second user, denying the second request.

20. The computer program product of claim 18, wherein the operations further comprise:
determining that the role assignments grant permission to the second artifact type to the second user;
determining that no instance-based policies exist for the second artifact type; and
determining to service the second request based on the role assignments granting permission to the second artifact type to the second user and a lack of instance-based policies for the second artifact type.

* * * * *